W. B. KIRKPATRICK.
PROCESS OF AGITATING WATER IN MAKING ICE.
APPLICATION FILED OCT. 6, 1917.
Reissued Nov. 6, 1917. 14,390.
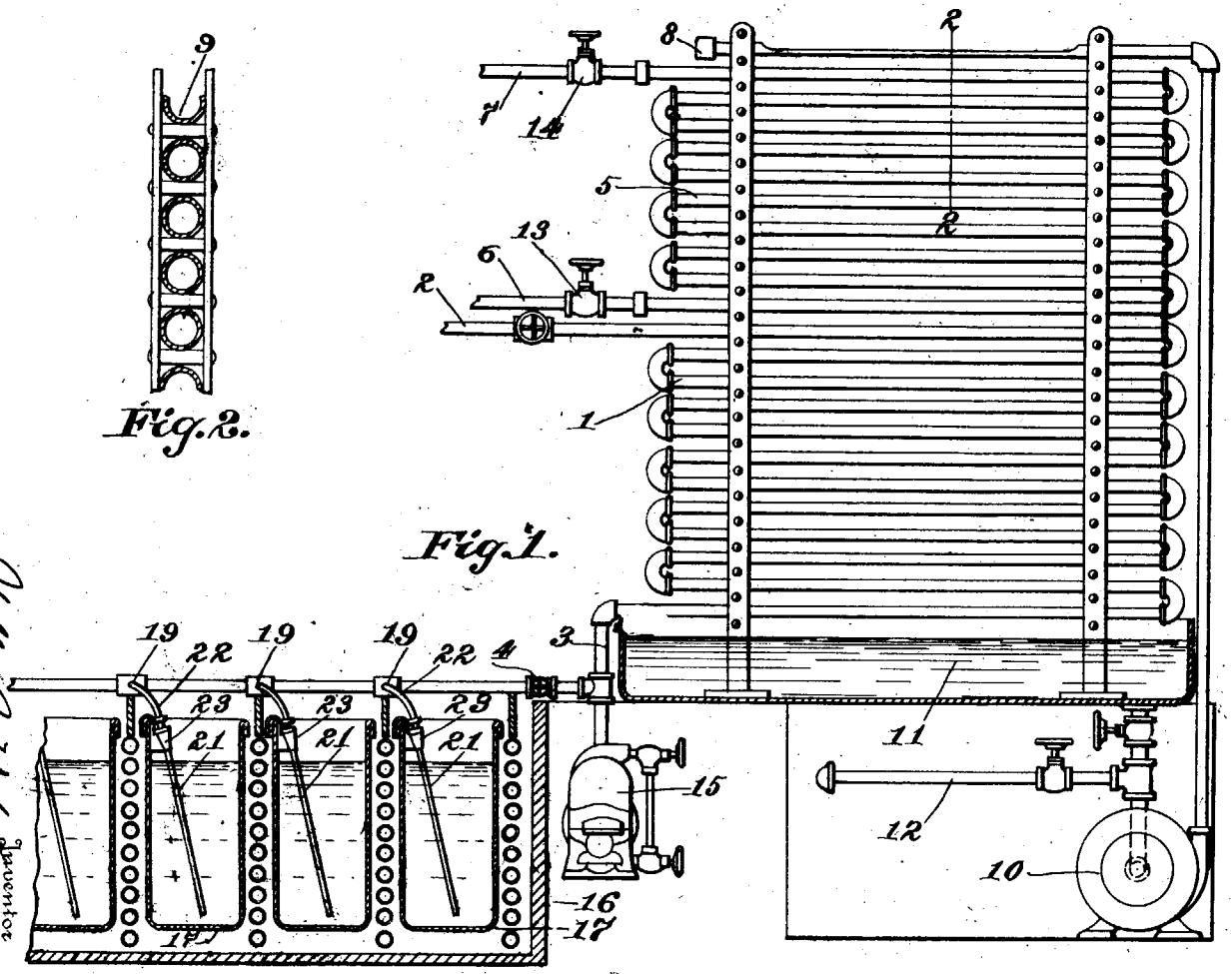
Witnesses
Porter H. Plautt.
Alice G. Donegan
Inventor
Willis B. Kirkpatrick
By Edwin H. Samuels
Attorney

UNITED STATES PATENT OFFICE.

WILLIS B. KIRKPATRICK, OF HARTSDALE, NEW YORK, ASSIGNOR TO INDEPENDENT ICE COMPANY OF BALTIMORE CITY, OF BALTIMORE, MARYLAND, A CORPORATION OF MARYLAND.

PROCESS OF AGITATING WATER IN MAKING ICE.

14,390. Specification of Reissued Letters Patent. Reissued Nov. 6, 1917.

Original patent'a continuation in part of applications Serial No. 6,987, filed February 9, 1915, and Serial No. 17,617, filed March 29, 1915. Original No. 1,161,219, dated November 23, 1915, Serial No. 41,026, filed July 21, 1915. Reissue No. 14,321, dated June 26, 1917. Serial No. 149,708, filed February 19, 1917. Application for this reissue filed October 6, 1917. Serial No. 195,117.

*To all whom it may concern:*

Be it known that I, WILLIS B. KIRKPATRICK, a citizen of the United States of America, residing at Hartsdale, Westchester county, New York, have invented certain new and useful Improvements in Processes of Agitating Water in Making Ice, of which the following is a specification.

The principal difficulty encountered in the practice of the aeration method in the past is that incident to maintaining an uninterrupted flow of air until the formation of the cake of ice has been substantially completed. The principal source of interruption which is of importance in this connection is due to the formation of frost in the drop pipe which leads air downward to the point where it is discharged at the bottom of the can. Also, the formation of ice in the can sometimes closes the mouth of the tube and the air system is sometimes blocked by the deposit of rust, sediment and the like. These latter difficulties are more fully treated in my Patents Nos. 1,162,075 and 1,169,164.

The diffe ent methods of aerating water in use are classified as high and low pressure. In the practice of the high pressure process, the air is first compressed to a comparatively high degree as fifty or sixty pounds per square inch and then cooled to near the freezing point to dehydrate it, when it is again permitted to expand to about eighteen to twenty-five pounds, the high pressure being used to get excessive dehydration. From this point the air pressure is again reduced by throttling, and the air is led through a pipe in the corner of the freezing can, or otherwise in contact with or in close proximity to the brine, to the bottom of the freezing can near the center where the air is released. This apparatus is subject to frequent stoppage owing to the formation of frost in the drop pipe and in the air cooling coils as just described. Also the compression of the air to fifty or sixty pounds which is incident to this process is expensive.

The low pressure method in which the air is handled cheaply at two or three pounds or thereabouts has a central drop pipe but it is not intended to continue air agitation until freezing is complete or nearly complete. The passage of the air always becomes blocked by the formation of ice in the can when about one-third of the water is still uncongealed; the pipe is removed and the space pumped out and filled with clear water. These two classes of apparatus are recognized and all systems in use prior to applicant's belonged to one or the other. In the applicant's invention under discussion the passage of the air upward through the can is kept open by the air pressure which, though normally low, builds up automatically when the outlet is obstructed.

The present invention relates to a method by means of which some of the features of the high and low pressure systems are so combined as to obtain the advantages and overcome the principal defects incident to each. To this end I have evolved a new method of operation which is such that obstruction of the system is almost impossible. According to this invention, I so deliver the air at the bottom of the cans that it is protected from the temperature of the brine and need not be cooled to or below the freezing point until the formation of the cake of ice is practically complete. This greatly reduces the formation of frost in the drop pipe and renders the excessive dehydration practiced in the high pressure system wholly unnecessary, for it will be understood that the high pressure and low temperatures used in the high pressure system are for the purpose of precipitating as much moisture as possible from the air and to thus overcome in a different way the tendency to choke the drop pipe with frost. In this connection, it will be noted that the high pressure system had always been used with delivery pipe passing in close proximity to the brine, the temperature of which is usually about 14°. F., while the delivery pipe in the present instance is near the center of the body of water to be frozen so that it does not come in contact with temperatures sufficiently low to freeze the moisture in the air until the formation of the cake is complete.

By thus avoiding the necessity for excessive dehydration and by other features hereinafter referred to, I have reduced the expense incident to compressing the air and increased the efficiency of the operation.

In the accompanying drawings, I have illustrated so much of my apparatus for aerating water in the manufacture of ice, as is necessary to complete understanding of the invention.

Figure 1 is a vertical section of a portion of a brine tank showing a number of cans in section and the drop pipes and supply pipes in elevation; also the air cooling device in elevation; and Fig. 2 is a section on the line 2, 2 of Fig. 1 showing the cooler in cross section.

Referring to the drawings by numerals, the apparatus as shown includes a cooling coil 1 having an inlet 2 to which air is supplied at a medium pressure, preferably from twelve to twenty-five pounds above atmosphere (a higher pressure does no harm but is more expensive and unnecessary in my system, and circulation is difficult to maintain at a pressure lower than twelve pounds), and an outlet 3 to the header 4 of the system by means of which the air for aerating the water is delivered to the cans. The cooling apparatus may include an ammonia coil 5, the helices of the ammonia coil being arranged in a vertical plane as are those of the air coil, the latter being placed directly under the former, as shown in cross section in Fig. 2, so that all the pipes of each cooling unit are in a single vertical plane. The inlet 6 of the ammonia coil is at the bottom, and the outlet 7 at the top.

Just over the ammonia coil I provide a water delivery pipe 8 which is preferably slotted throughout its entire length as at 9 or otherwise provided with suitable orifices to discharge water and permit it to flow uniformly over the entire coil. Water is supplied to the delivery or sprinkler pipe 8 by a pump 10 or other suitable and convenient means, either taking the water from the catch basin 11 beneath the coils or from an outside source by way of the pipe 12.

One means by which clogging in the dehydrator may be avoided consists in the use of pure water instead of brine or the equivalent as a cooling medium in connection with the ammonia and air coils, and of valves, either automatically or manually operated at 13 and 14 by means of which the pressure and expansion of the ammonia vapor may be so regulated as to give the desired temperature, but even in the absence of such regulation of the pressure of the ammonia vapor, the air pipes cannot be cooled below freezing if the cooling effect is transferred from the ammonia pipes to the air pipes by means of fresh water, flowing in a film by gravity from the ammonia to the air pipes, and this flow could not of course be maintained at freezing temperatures. Substantially pure water having the same freezing point as pure water may be used with the same result. Under these circumstances it is practically impossible to reduce the temperature of the air to a point lower than five or six degrees Fahrenheit above the freezing point and at this temperature, the dehydrator tubes cannot become stopped with frost. The temperature of the air in the dehydrator may go much higher without detriment to the operation of the plant.

An important advantage of my method consists in the possibility of handling and delivering the air for agitating the water at temperatures which may be well above freezing. A most convenient way of doing this is by using clear water as a heat transfer medium in the dehydrator but other means for cooling the air and dehydrating it may be employed within the scope of my invention. The use of clear water for this purpose is one feature only of several involved in the method which is the subject of the invention. As I have stated, the air passes through the cooling coil at a medium pressure which may be varied from twelve to twenty-five pounds above the atmosphere, but at this pressure with average humidity, a considerable amount of condensation takes place and the moisture thus condensed may be removed by a suitable trap or drip of commercial variety shown at 15.

In Fig. 1 at the left, I have shown a portion of a brine tank 16 of the type commonly used in the manufacture of can ice, together with a number of cans 17 in operative position for freezing. The area occupied by the tank is traversed by headers 4 leading from the cooler. From the header 4 a lateral extends outward between each two lines of cans and inserted in each lateral between each pair of cans is a four-way fitting, or cross 19 which may contain a reducing valve or orifice by which the normal air pressure is dropped to a point slightly above atmosphere, as shown and described in my patent referred to. Two arms of each cross-fitting 19 preferably extend along the sides of the adjacent cans to a point near the center and the air is led by suitable means as the connection 22, shown in Fig. 1, to the drop pipe 21 which discharges the air at the bottom near the center of the can. The drop pipe which I use is straight so that it may be conveniently withdrawn from the cake, after heating slightly to release it, and it is set into the can either vertically, spaced from the sides, as in my Patent No. 1,169,164, or in an inclined position as described in my Patent No. 1,162,075. The inclined pipe 21 as shown, is supported by the bracket 23, fully described in the last named patent and is connected to the air distributing system by a flexible hose 22, the rigid portion of the pipe 21 being straight and conveniently arranged for the introduction of a steam nozzle by means of which it may be released, and then being perfectly straight may be conveniently withdrawn.

While the pipe as shown does not occupy the axial center of the can, it delivers at the bottom near the center and as freezing takes place from the sides and bottom, the last part frozen being the central portion near the top, the pipe is in this way protected from the low temperature of the brine. In fact, it does not become frozen until the freezing of the cake of ice is well advanced and even then, being adjacent the free water it is not subject to a temperature appreciably below the freezing point, so that obstruction of the drop pipe by frost when delivering air, cooled as described herein by the flow of clear water over the air cooling coil, is not an element which need be taken into account in the conduct of the plant. This makes it possible to use air dehydrated at comparatively high temperatures. If air dehydrated at low temperatures is conveniently obtainable, its use would work no harm but dehydration at lower temperatures is more expensive. The advantages of the inclined pipe arranged as described, are fully set forth in my Patent No. 1,162,075, and need not be enlarged upon in this specification; it is not part of this invention.

While the preferred method of protecting the air pipe from the low temperature of the brine is by passing the drop pipe through the body of water to be frozen keeping it well away from the sides of the can, the pipe may be otherwise protected from the low temperature of the brine, thus accomplishing the method of my invention, by other means obvious to those skilled in the art, though these devices are considered less practical than that specifically described.

The operation of the system will be described in connection with the process of my invention. Starting with the cans filled with water and the drop pipes in position as shown in Fig. 1, the connections being made from each cross-fitting 19 to the corresponding drop pipes 21 by means of a hose or flexible tube 22, ammonia is applied to the coil 5 by way of the inlet 6. Air at medium pressure, determined as sufficient to keep the air passage to the can open until freezing is complete, is applied to the coil 1 by way of the inlet 2 and water is passed over the ammonia and air coils as indicated. The temperature of the air pipes is controlled and may be kept above freezing by using clear water as a heat transfer means, fresh water serving to prevent the reduction of the temperature of the air to an extent sufficient to cause frost in the pipes. The water which may be condensed by this drop in pressure, the quantity depending upon the humidity of the air, there being none under some conditions, is removed from the drip 15 and the cooled air is delivered to the header 4 whence it is distributed by way of crosses 19 and the drop pipes 21. It will be understood that the initial pressure at the inlet 2 is substantially maintained throughout the system as far as the reducing orifices referred to herein and described in the Patent No. 1,169,164. At this point the air is expanded and throttled down to a pressure slightly above atmosphere, for a higher pressure would interfere with freezing and would blow the water from the cans.

To keep the passage of the drop pipe from being closed by the ice formed in the can in the regular process of freezing, the full initial pressure is sometimes necessary. This is obtained by the simple expedient of permitting the air which escapes to back up until it reaches the pressure of the coil or inlet or becomes sufficient to open the passage through the ice.

In practice it is found that with twelve or fifteen pounds pressure at the air inlet, the drop pipe constructed as described, will keep open until the ice cake is complete. If any obstruction takes place, this is quickly broken by the rise of pressure.

It will also be apparent that by the use of a drop pipe which is protected from the lower temperatures by being placed near the center of the can, I have rendered the use of high pressures to produce excessive dehydration unnecessary, for formation of frost in the drop pipe is practically eliminated. This also results in greatly increased economy and a system of unparalleled efficiency in that obstructions of the air pipe, resulting in white ice, are so infrequent that a practically uniform product of the highest quality is produced with the least expenditure for labor and attendance.

I have thus described the method which is the subject of my invention specifically and in detail in order that its nature and operation may be fully understood; however, the specific terms herein are used in their descriptive rather than in their limiting sense and the scope of the invention is defined in the claims.

I claim:

1. A process of agitating water by air in the manufacture of ice which consists in providing a supply of dehydrated air at a pressure of from twelve to twenty-five pounds above atmosphere, passing said air through a conduit within the mass of water to be frozen, reducing the pressure of the air before it is released to a point slightly in excess of that of the atmosphere, and delivering said air into the water near the bottom of the mass.

2. A process of agitating water by air in the manufacture of ice which consists in providing a supply of dehydrated air compressed to a pressure of from twelve to twenty-five pounds above atmosphere and having a temperature of five or six degrees above freezing, passing said air through a suitable passage at or near the center of the mass of water to be frozen, reducing the pressure of the air before it is released so that it is slightly in excess of that of the atmosphere, and delivering said air near the bottom of the mass of water to be frozen.

3. A process of manufacturing ice which consists in freezing the water in cans in a non-freezing liquid as brine at a temperature well below the freezing point of water, agitating the water with compressed dehydrated air at a temperature at least five or six degrees above freezing, leading the air to and through a conduit within the mass of water to be frozen so that in its passage the air is protected from the temperature of the brine by the mass of water to be frozen, and releasing it at the bottom of the mass of water to be frozen.

4. A process of agitating water by air in the manufacture of ice which consists in providing a supply of dehydrated air at a pressure above twelve pounds above atmosphere, passing such air through a conduit within the mass of water to be frozen following a path spaced away from the sides of the body of water, and delivering the air at a reduced pressure into the mass of water near the bottom thereof.

5. A process of making raw water can ice which consists in immersing a can of water in a freezing liquid, providing a supply of dehydrated air at a pressure above twelve pounds above atmosphere, passing the air downward through a conduit in the mass of water spaced away from the freezing liquid so that the water protects the air from the temperature of the freezing liquid, releasing the air at a reduced pressure near the bottom of the water to be frozen, and continuing the passage of the air until all the water available for the manufacture of clear ice is frozen.

6. A process of removing moisture from compressed air which consists in circulating practically pure water in indirect heat exchange with a refrigerant, bringing such water into indirect heat exchanging relation with the compressed air whereby a portion of the moisture in said air is condensed, and then separating such condensed moisture from the air.

Signed by me at New York, N. Y., this 29th day of September, 1917.

WILLIS B. KIRKPATRICK.

Witnesses:
H. R. Howell,
H. W. Sack.